United States Patent
Yang et al.

(10) Patent No.: US 11,205,808 B2
(45) Date of Patent: Dec. 21, 2021

(54) TERMINAL DEVICE AND METHOD FOR DETECTING LITHIUM SEPARATION OF A BATTERY

(71) Applicant: Dongguan Amperex Technology Limited, Dongguan (CN)

(72) Inventors: Chao Yang, Dongguan (CN); XueFeng Liu, Dongguan (CN); Jianchang Luo, Dongguan (CN); JinHui Chen, Dongguan (CN); Ying Wang, Dongguan (CN); Guanghui Chen, Dongguan (CN); ChunHua Bian, Dongguan (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 161 days.

(21) Appl. No.: 16/529,930

(22) Filed: Aug. 2, 2019

(65) Prior Publication Data

US 2020/0381786 A1      Dec. 3, 2020

(30) Foreign Application Priority Data

May 31, 2019   (CN) .......................... 201910473115.5

(51) Int. Cl.
   *H01M 10/48*   (2006.01)
   *H02J 7/00*    (2006.01)
   *H01M 10/42*   (2006.01)

(52) U.S. Cl.
   CPC ......... *H01M 10/48* (2013.01); *H01M 10/425* (2013.01); *H01M 10/4285* (2013.01); *H02J 7/0029* (2013.01); *H01M 2010/4271* (2013.01); *H02J 7/00302* (2020.01); *H02J 7/00306* (2020.01)

(58) Field of Classification Search
   CPC .......... H01M 10/425; H01M 10/4285; H01M 10/48; H01M 2010/4271; H02J 7/0029; H02J 7/00302; H02J 7/00306; H02J 7/0069; Y02E 60/10
   See application file for complete search history.

(56) References Cited

U.S. PATENT DOCUMENTS

2012/0166847 A1*   6/2012   Noda ................ H01M 10/4207
                                                            713/323

* cited by examiner

*Primary Examiner* — Victoria H Lynch
(74) *Attorney, Agent, or Firm* — Westerman, Hattori, Daniels & Adrian, LLP (57) ABSTRACT

A method for detecting a lithium separation phenomenon of a battery of a terminal device is provided. The method includes detecting a working state of the battery, and collecting a first voltage of the battery when the working state of the battery is the resting state. The method further include collecting a second voltage of the battery when the battery is left to stand for a preset period of time, and determining whether the lithium separation phenomenon has occurred according to the first voltage and the second voltage. The implementation of the application can detect whether the lithium separation phenomenon has occurred in the battery and trigger a protection circuit of the battery in time when the lithium separation phenomenon has occurred in the battery.

12 Claims, 6 Drawing Sheets

TERMINAL DEVICE AND METHOD FOR DETECTING LITHIUM SEPARATION OF A BATTERY

CROSS-REFERENCE TO RELATED APPLICATIONS

This application claims priority to Chinese Patent Application No. 201910473115.5 filed on May 31, 2019, the contents of which are incorporated by reference herein.

FIELD

The subject matter herein generally relates to batteries.

BACKGROUND

A terminal device (e.g., electric motorcycle, electric car, and mobile phone) may have a battery. A lithium separation phenomenon may occur during the use of the battery, and the phenomenon of lithium separation greatly affects the service life and safety of the battery.

SUMMARY

What is needed, is a battery lithium detection method, a terminal device, and a non-transitory storage medium. The method can determine whether the lithium separation phenomenon has occurred in the battery.

The method for detecting a lithium separation phenomenon of the battery includes: detecting a working state of the battery; collecting a first voltage of the battery when the working state of the battery is the resting state; collecting a second voltage of the battery when the battery is left to stand for a preset period of time; and determining whether the lithium separation phenomenon has occurred according to the first voltage and the second voltage.

The terminal device includes: a battery, a storage device, at least one processor, and the storage device further storing one or more programs that, when executed by the at least one processor, cause the at least one processor to: detect a working state of the battery; collect a first voltage of the battery when the working state of the battery is the resting state; collect a second voltage of the battery when the battery is left to stand for a preset period of time; and determine whether the lithium separation phenomenon has occurred according to the first voltage and the second voltage.

A non-transitory storage medium having stored thereon instructions that, when executed by a processor of an terminal device, causes the processor to perform a battery health detecting method, the terminal device includes a battery, the method includes: detecting a working state of the battery; collecting a first voltage of the battery when the working state of the battery is the resting state; collecting a second voltage of the battery when the battery is left to stand for a preset period of time; and determining whether the lithium separation phenomenon has occurred according to the first voltage and the second voltage.

The battery lithium detection method can determine whether a lithium separation phenomenon has occurred in a battery according to a change of the voltage across the battery when the battery has left for a preset period of time after charging. For example, a first voltage V1 is collected when the battery is charged. And a second voltage V2 is collected after the battery is left for a preset period of time. Whether the lithium separation phenomenon has occurred can be determined according to the difference between the second voltage V2 and the first voltage V1. The implementation process of the method is relatively simple, and the battery can be detected in a non-destructive and real-time manner, and the protection mechanism of the battery is triggered in time when it is determined that the lithium separation phenomenon has occurred.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
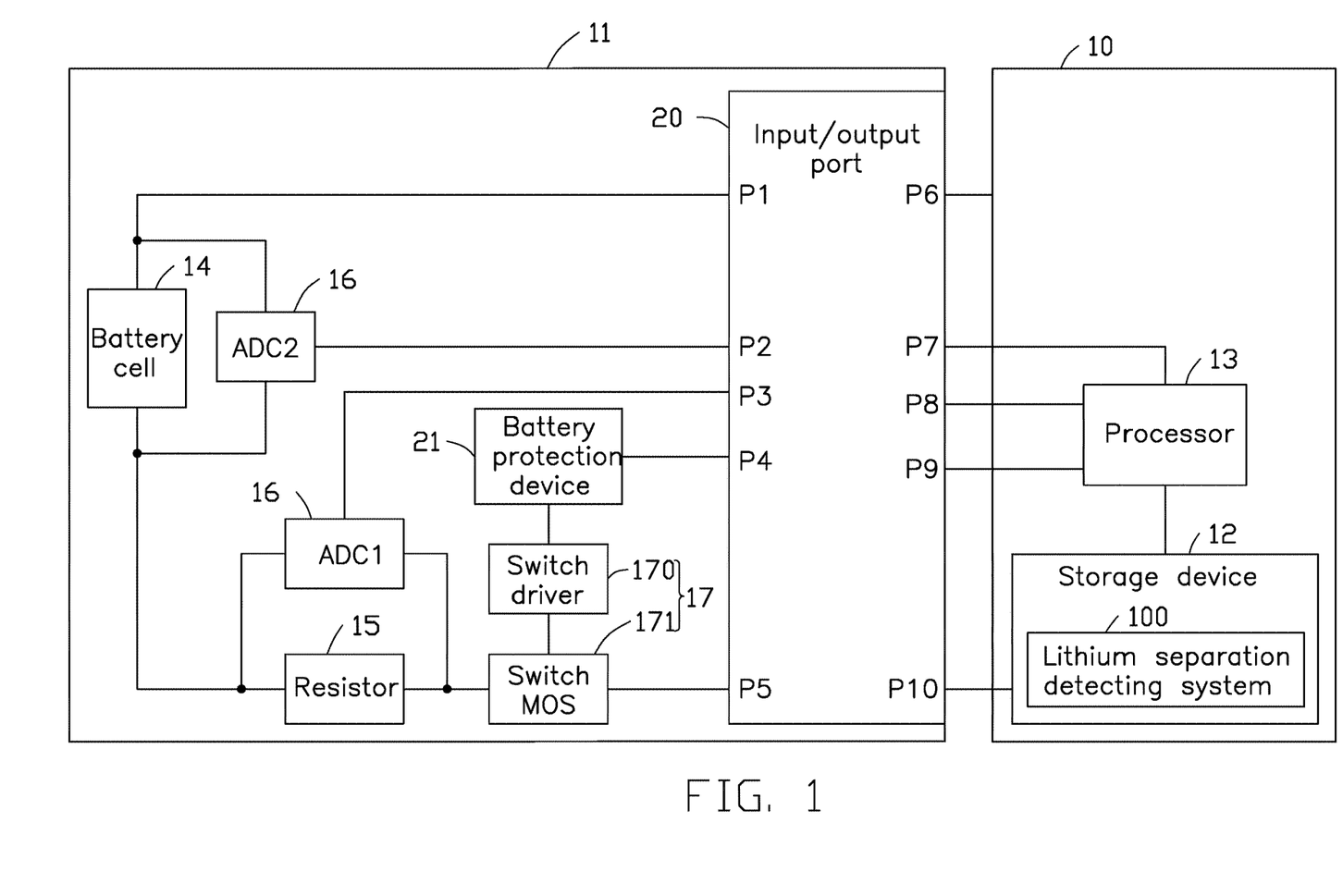
FIG. 1 is a block diagram of an embodiment of a terminal device including a lithium separation detecting system.

FIG. 1 is a block diagram of an embodiment of a terminal device including a lithium separation detecting system. The lithium separation detecting system 100 is applied to a terminal device 10. The terminal device 10 is electrically connected to a battery 11. The battery 11 can include, but is not limited to, a battery cell 14, a resistor 15, an analog to digital converter 16, a battery protection device 21, a switch assembly 17, and an input/output port 20. A signal pin P5 of the input/output port 20 sequentially forms a loop through the switch assembly 17, the resistor 15, the battery cell 14, and signal pin P1 of the input/output port 20.

In at least one embodiment, the analog to digital converter 16 includes a first analog to digital converter ADC1 and a second analog to digital converter ADC2. A first end of the resistor 15 is electrically connected to a first end of the ADC1, and a second end of the resistor 15 is electrically connected to a second end of the ADC1. The ADC1 can collect current of the resistor 15 (the current value of the resistor 15 can be the current value of the battery cell 14 and also represents the current value of the battery 11). A third end of the ADC1 is connected to a signal pin P2 of the input/output port 20. A first end of the battery cell 14 is electrically connected to a first end of the ADC2, and a second end of the battery cell 14 is electrically connected to a second end of the ADC2. The ADC2 can collect the voltage of the battery cell 14. A third end of the ADC2 is electrically connected to a signal pin P3 of the input/output port 20.

In at least one embodiment, the switch assembly 17 can include a switch driver 170 and a switch MOS 171. The switch assembly 17 is electrically connected to a signal pin P4 of the input/output port 20 through the battery protection device 21.

In at least one embodiment, the battery 11 is a rechargeable battery for supplying power to the terminal device 10. For example, the battery 11 may be a lithium ion battery, a lithium polymer battery, a lithium iron phosphate battery, or the like.

In at least one embodiment, the terminal device 10 can further include, but is not limited to, a storage device 12, at least one processor 13, a computer program stored in the storage device 12 and operable on the at least one processor 13 and at least one communication bus. The at least one processor 13 can implement steps in the embodiment of the battery lithium detection method herein disclosed when the computer program is executed. Signal pins P6, P7 and P8 of the input/output port of the battery 11 are electrically connected to the processor 13. The signal pin P6 can transmit the voltage signal collected by the ADC2 to the processor 13, the signal pin P7 can transmit the current signal collected by the ADC1 to the processor 13, and the signal pin P8 can transmit a CTL signal sent by the battery protection device 21 to the processor 13.

In at least one embodiment, the storage device 12 can be an internal storage device, such as a flash memory, a random access memory (RAM) for temporary storage, and/or a read-only memory (ROM) for permanent storage. The storage device 12 can also be an external storage device, such as an external hard disk, a storage card, or a data storage medium. The at least one processor 13 can be a central processing unit (CPU), a microprocessor, or other data processor chip that performs functions of the terminal device 10.

FIG. 1 illustrates only one example of the terminal device 10, other examples can comprise more or fewer components that those shown in the embodiment, or have a different configuration of the various components. The terminal device 10 can be, but is not limited to, an electric motorcycle, an electric bicycle, an electric car, a mobile phone, a tablet computer, a personal digital assistant (PDA), a personal computer, or any other suitable terminal device.

In at least one embodiment, the terminal device 10 may further include other components such as a WI-FI unit, a BLUETOOTH unit, a speaker, and the like.

Figure 6:
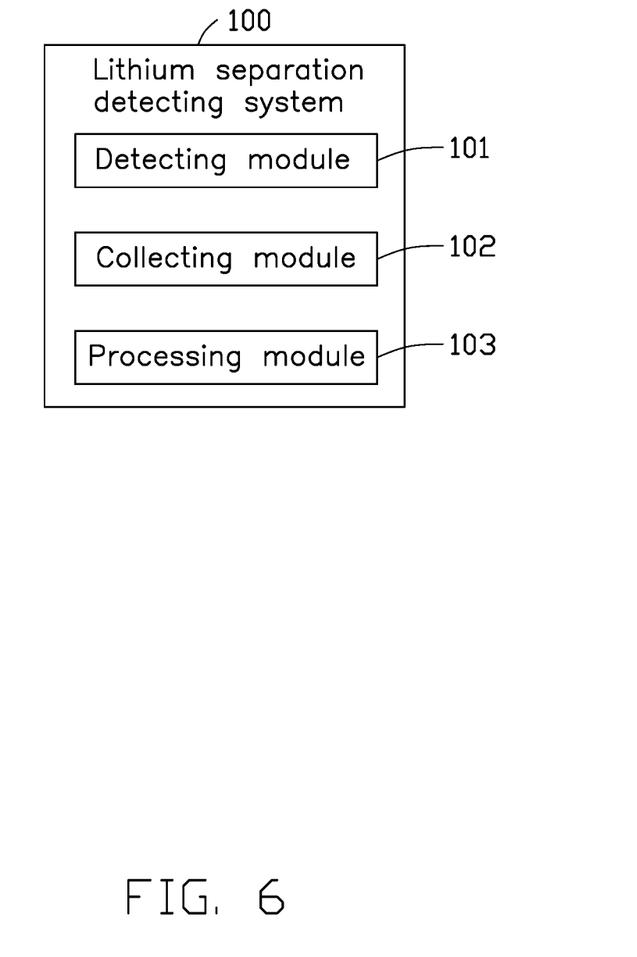
FIG. 6 is a block diagram of one embodiment of the lithium separation detecting system.

In at least one embodiment, the lithium separation detecting system 10 as shown in FIG. 6 can include, but is not limited to, a detecting module 101, a collecting module 102, and a processing module 103. The modules 101-103 can include computerized instructions in the form of one or more computer-readable programs that can be stored in a non-transitory computer-readable medium, for example in the storage device 12, and executed by the processor 13 of the terminal device 10. Functions of the modules 101-103 are described with reference to FIG. 2.

Figure 2:
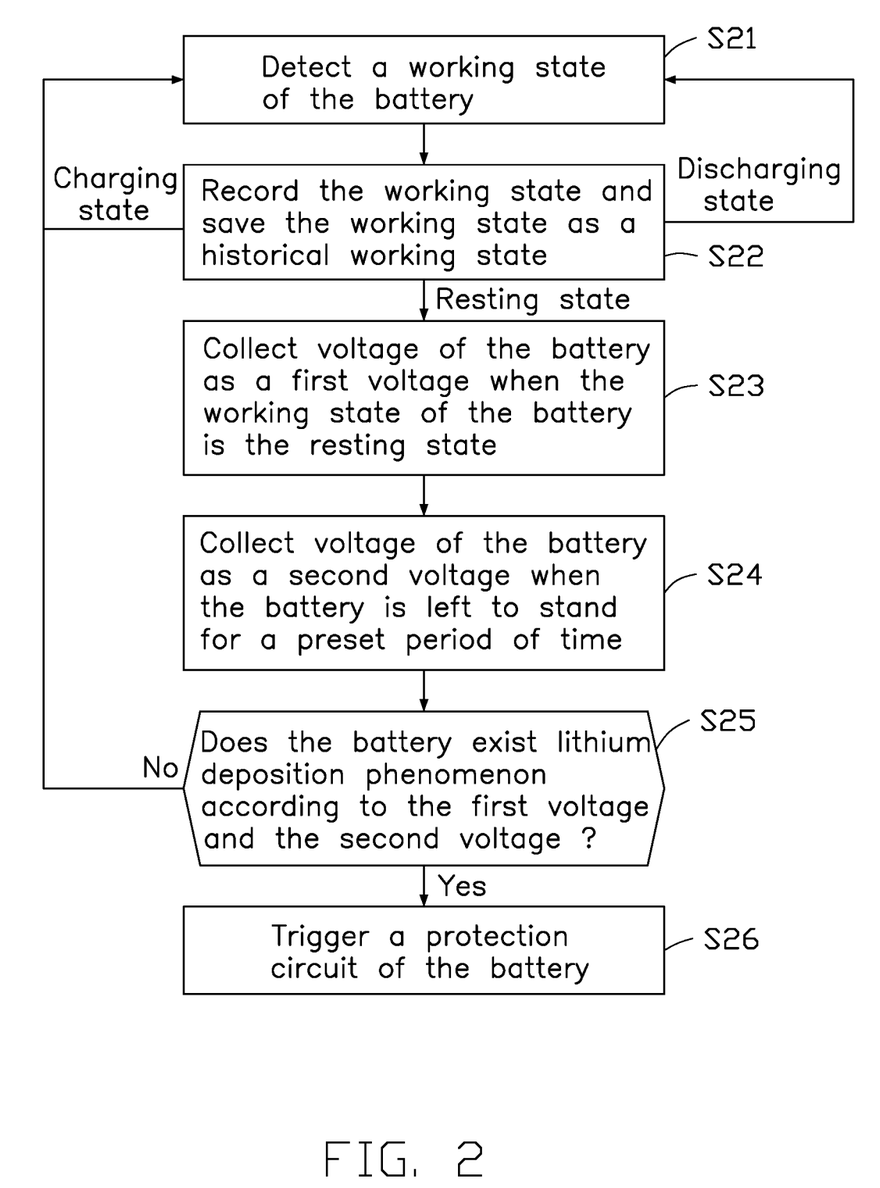
FIG. 2 is a flowchart of an embodiment of a method for detecting lithium separation of a battery.

FIG. 2 illustrates a flowchart of a method for detecting lithium separation of the battery. In an example embodiment, the method is performed by execution of computer-readable software program codes or instructions by the at least one processor 13 of the terminal device 10.

Referring to FIG. 2, the method is provided by way of example, as there are a variety of ways to carry out the method. The method described below can be carried out using the configurations illustrated in FIG. 1, for example, and various elements of these figures are referenced in explaining method. Each block shown in FIG. 2 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S21.

At block S21, the detecting module 101 can detect a working state of the battery 11.

In at least one embodiment, the processor 13 can receive signal as to the detected working state of the battery 11. The working state of the battery 11 can include a charging state, a discharging state, and a resting state.

In at least one embodiment, the ADC 1 can collect a first current value of the battery 11 every first time interval (e.g., 500 ms) and obtain a number of first current values and transmit the number of first current values to the processor 13. It should be noted that the first current value of the battery 11 is a current value in a loop formed by the battery 11 and load. After receiving the number of first current values, the processor 13 can determine the working state of the battery 11 by comparing each of the number of first current values with a current threshold. The first time interval may be 1 second, and the current threshold may be 5 mA. In the present application, the first current value is a positive value when charging the battery 11, and the first current value is a negative value when discharging the battery 11. The current threshold is a positive value.

In at least one embodiment, the detecting module 101 can determine that the working state of the battery 11 is the charging state when each of the number of first current values is greater than the current threshold. The detecting module 101 can determine that the working state of the battery 11 is the discharging state when each of the number of first current values is less than an opposite value of the current threshold. The detecting module 101 can determine that the working state of the battery 11 is the resting state when an absolute value of each of the number of first current values is less than or equal to the current threshold.

At block S22, the detecting module 101 can record the working state and save the working state as a historical working state.

In at least one embodiment, when the detecting module 101 determines that the working state of the battery is the charging state, the detecting module 101 can record the charging state and saved the charging state as the historical working state of the battery 11. Then, the process returns to block S21 to continue detecting the working state of the battery 11. When the detecting module 101 determines that the working state of the battery 11 is the discharging state, the detecting module 101 can record the discharging state and saved the discharging state as the historical working state of the battery 11. Then, the process returns to block S21 to continue detecting the working state of the battery 11. When the detecting module 101 determines that the working state of the battery 11 is the resting state, the detecting module 101 can record the resting state and saved the resting state as the historical working state of the battery 11. Then, the process goes to block S23.

At block S23, the collecting module 102 can collect voltage of the battery 11 as a first voltage when the working state of the battery 11 is the resting state.

In at least one embodiment, a change of the working state of the battery 11 is determined by comparing the detected working state of the battery 11 with the recorded historical working state. For example, when the detected working state of the battery 11 is a resting state, and the latest recorded working state of the historical working state is a resting state, the collecting module 102 can determine that the working state of the battery 11 is maintained and unchanged, and the detecting module 101 continues to detect the working state of the battery 11. When the detected working state of the battery 11 is a resting state, and the latest recorded working state of the historical working state is a discharging state, the collecting module 102 can determine that the working state of the battery 11 is changed from the discharging state to the resting state. The detecting module 101 continues to detect the working state of the battery 11. When the detected working state of the battery 11 is a resting state, and the latest recorded working state of the historical working state is a charging state, the collecting module 102 can determine that the working state of the battery 11 is changed from the charging state to the resting state. The collecting module 102 collects the first voltage of the battery 11.

In at least one embodiment, the collecting module 102 can collect a second current value of the battery 11 when the battery 11 is resting for a second time interval (e.g., 1 second). As the current value of the resistor 15 can represent the current value of the battery 11, the collecting module 102 can collect the second current value of the resistor 15 and set the collected second current value as the current value of the battery 11. For example, the collecting module 102 can collect a second current value of the resistor 15 by the ADC1, and transmit the second current value to the detecting module 101. The detecting module 101 can compare the second current value with the current threshold, and when the second current value is greater than the current threshold, the detecting module 101 continues to detect the working state of the battery 11. When the second current value is less than the opposite value of the current threshold, the detecting module 101 continues to detect the working state of the battery 11. The detecting module 101 can collect the first voltage V1 of the battery 11 when the absolute value of the second current value is less than or equal to the current threshold.

At block S24, the collecting module 102 can collect voltage of the battery 11 as a second voltage when battery 11 is left to stand for a preset period of time.

In at least one embodiment, the collecting module 102 can determine a working state of the battery 11 by comparing a third current value collected by the ADC1 with the current threshold. When the third current value is greater than the current threshold, the detecting module 101 can determine that the working state of the battery 11 is the charging state and continue to detect the working state of the battery 11. When the third current value is less than the opposite value of the current threshold, the detecting module 101 can determine that the working state of the battery 11 is the discharging state and continue to detect the working state of the battery 11. When the absolute value of the third current value is less than or equal to the current threshold, the detecting module 101 can determine that the working state of the battery 11 is the resting state and collect the second voltage V2 of the battery 11.

In at least one embodiment, the battery 11 is left to stand for the preset period of time means that the battery 11 is in the resting state for the preset period of time.

In at least one embodiment, the preset period of time is greater than the second time interval.

At block S25, the processing module 103 can determine whether lithium separation phenomenon has occurred in the battery 11 according to the first voltage V1 and the second voltage V2.

In at least one embodiment, the processing module 103 can calculate a difference of the second voltage V2 minus the first voltage V1, and determine whether lithium separation phenomenon has occurred by comparing the difference with a preset voltage value. When the difference is greater than the preset voltage value, the processing module 103 can determine that the lithium separation phenomenon has occurred, the process goes to block S26. When the difference is less than or equal to the preset voltage value, the processing module 103 can determine that lithium separation phenomenon does not occur, and the process returns to block S21.

In at least one embodiment, the preset voltage value is related to the sampling accuracy of the analog to digital converter 16 and the like. Preferably, the preset voltage value is 0.06V.

In at least one embodiment, the first voltage and the second voltage are absolute values of voltage across the battery cell 14. In this embodiment, the voltage across the battery cell 14 is acquired by the second analog-to-digital converter ADC2.

At block S26, the processing module 104 can trigger a protection circuit of the battery 11.

In at least one embodiment, the processing module 104 can send a control command to the battery 11 for triggering the protection circuit when it is determined that the lithium separation phenomenon has occurred. For example, the processing module 104 can send the control command to trigger the switch driver 170 to turn off the switch MOS 171.

In at least one embodiment, the battery 11 may include one battery cell 14, or may include a plurality of battery cells 14. When the battery 11 includes one battery cell 14, the battery lithium detecting method can determine whether the lithium separation phenomenon has occurred by performing the above blocks S21 to S26. When the battery 11 includes a plurality of battery cells 14, the collecting module 102 can collect the voltages of the plurality of battery cells 14 as the first voltage, and collect the voltages of the plurality of battery cells 14 as the second voltage after the battery is left for the preset period of time. The determining module 104 can then determine the occurrence of lithium separation phenomenon according to the first voltage and the second voltage.

For example, the processing module 103 can calculate a difference of the second voltage of each battery cell 14 minus the first voltage of each battery cell 14, and determine whether lithium separation phenomenon has occurred by comparing the difference with the preset voltage value. When the difference of one battery cell 14 is greater than the preset voltage value, the processing module 103 can determine that the lithium separation phenomenon has occurred, the process goes to block S26. When the differences of all battery cells 14 are less than or equal to the preset voltage value, the processing module 103 can determine that the lithium separation phenomenon does not occur, and the process returns to block S21.

Figure 3:
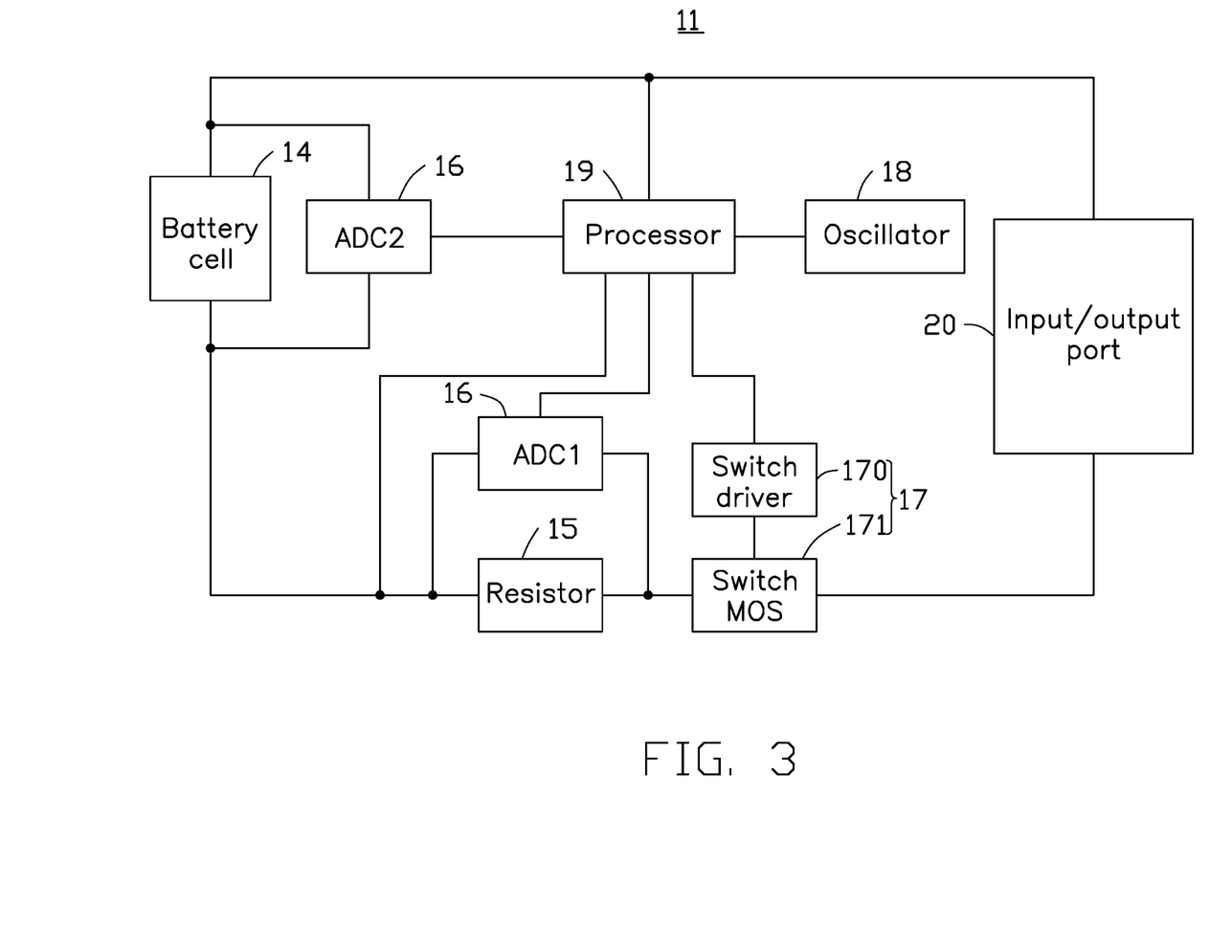
FIG. 3 is a schematic diagram of an embodiment of a circuit structure of a battery.

FIG. 3 is a schematic diagram of a circuit structure of a battery of one embodiment. In at least one embodiment, the battery 11 can include a battery cell 14, a resistor 15, an analog to digital converter 16, a switch assembly 17, an oscillator 18, a processor 19, and an input/output port 20. The processor 19 is electrically connected to the battery cell 14, the resistor 15, the analog to digital converter 16, the switch component 17, the oscillator 18, and the input/output port 20.

In at least one embodiment, the analog to digital converter 16 may include at least a first analog to digital converter ADC1 and a second analog to digital converter ADC2. A first end of the resistor 15 is electrically connected to a first end of the ADC1, and a second end of the resistor 15 is electrically connected to a second end of the ADC1. The ADC1 can collect current of the resistor 15. A third end of the ADC1 is electrically connected to the processor 19. A first end of the battery cell 14 is electrically connected to a first end of the ADC2, and a second end of the battery cell 14 is electrically connected to a second end of the ADC2. The ADC2 can collect the voltage of the battery cell 14. A third end of the ADC2 is electrically connected to the processor 19.

In at least one embodiment, the switch assembly 17 can include a switch driver 170 and a switch MOS 171. The switch assembly 17 protects the battery 11 against overcharging, over-discharging, and overheating in continued use of the battery 11. The oscillator 18 can output a clock signal having a relatively stable frequency. The input/output port 20 can connect to the terminal device 10.

In at least one embodiment, the battery 11 is a rechargeable battery for supplying power to the terminal device 10. For example, the battery 11 may be a lithium ion battery, a lithium polymer battery, a lithium iron phosphate battery, or the like. The battery 11 is connected to the processor 19 through a power management system. The power management system can implement functions such as charging, discharging, and power consumption management for the battery 11.

In at least one embodiment, the processor 19 can perform the battery lithium detection method as described in FIG. 2. For example, the processor 19 can detect a working state of the battery 11, and record the working state and save the recorded working state as a historical working state. When the working state of the battery 11 enters a resting state, the processor 19 can receive a first voltage of the battery cell 14 collected by the ADC 2. The processor 19 can receive a second voltage of the battery cell 14 collected by the ADC2 after the battery 11 is left for the preset period of time. The processor 19 can determine whether the lithium separation phenomenon has occurred in the battery 11 according to the first voltage and the second voltage. When the lithium separation phenomenon has occurred in the battery 11, the processor 19 can trigger the protection circuit of the battery 11.

Figure 4:
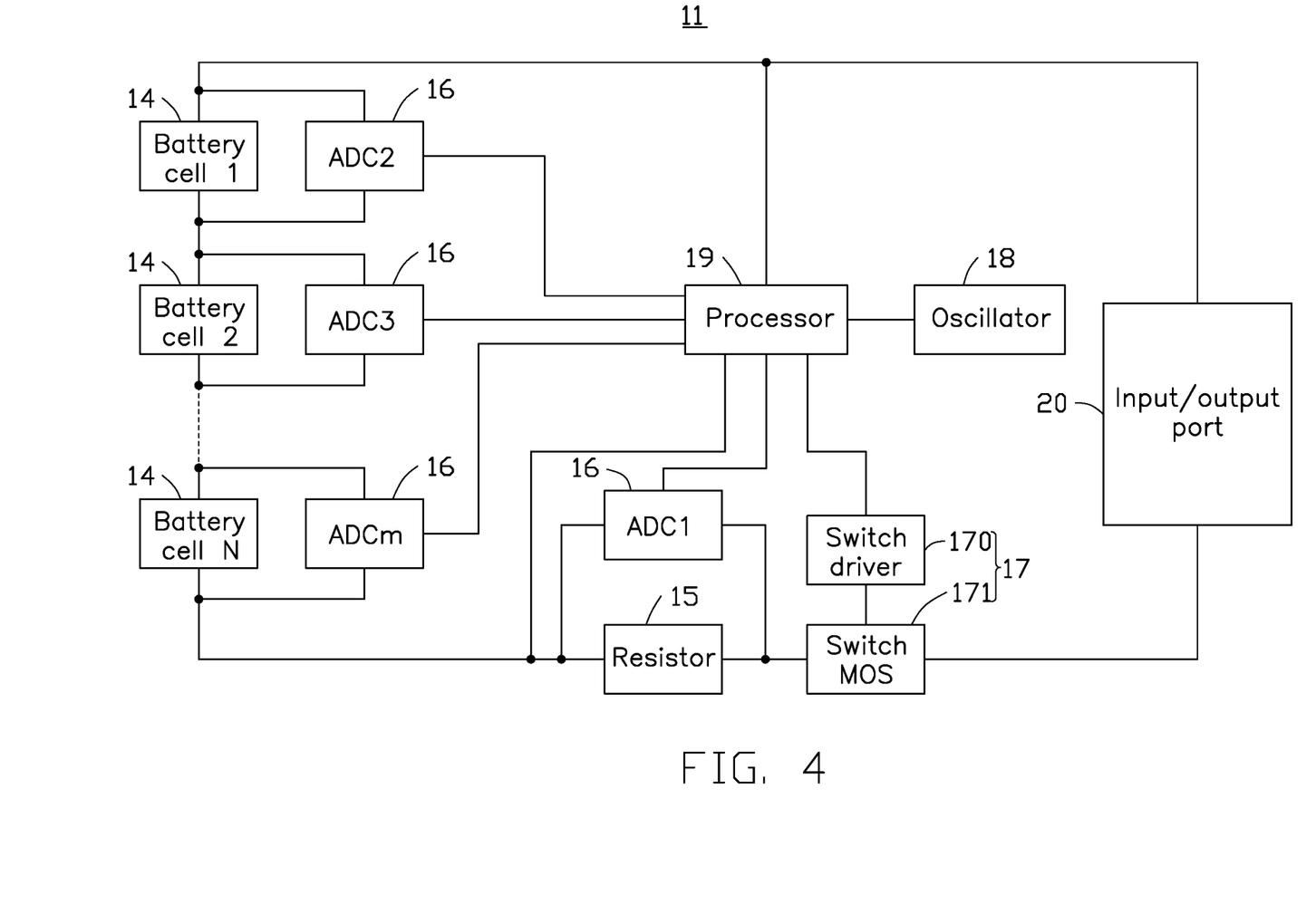
FIG. 4 is a schematic diagram of another embodiment of a circuit structure of a battery.

FIG. 4 is a schematic diagram of a circuit structure of a battery of another embodiment. In at least one embodiment, the battery 11 can include several battery cells 14, a resistor 15, an analog to digital converter 16, a switch assembly 17, an oscillator 18, a processor 19, and an input/output port 20. The processor 19 is electrically connected to the several battery cells 14, the resistor 15, the analog to digital converter 16, the switch component 17, the oscillator 18, and the input/output port 20. The switch assembly 17 can protect the charging/discharging processes of the battery 11 from overcharging, over-discharging, and overheating to ensure safe operation of the battery 11. The oscillator 18 can output a clock signal having a relatively stable frequency. The input/output port 20 can connect to the terminal device 10. The processor 19 can perform a method of another embodiment as illustrated in FIG. 5.

In at least one embodiment, a first end of each battery cell 14 is electrically connected to a first end of the analog to digital converter 16, and a second end of each battery cell 14 is electrically connected to a second end of the analog to digital converter 16. A third end of the analog to digital converter 16 is electrically connected to the processor 19. The analog to digital converter 16 can collect voltage of the battery cell 14 and send the collected voltage to the processor 19. For example, a first end of the battery cell 1 is electrically connected to a first end of the analog to digital converter ADC2, and a second end of the battery cell 1 is electrically connected to a second end of the analog to digital converter ADC2. A first end of the battery cell 2 is electrically connected to a first end of the analog to digital converter ADC3, and a second end of the battery cell 2 is electrically connected to a second end of the analog to digital converter ADC3, and so on. A first end of the battery cell N is electrically connected to a first end of the analog to digital converter ADCm, and a second end of the battery cell N is electrically connected to a second end of the analog to digital converter ADCm.

Figure 5:
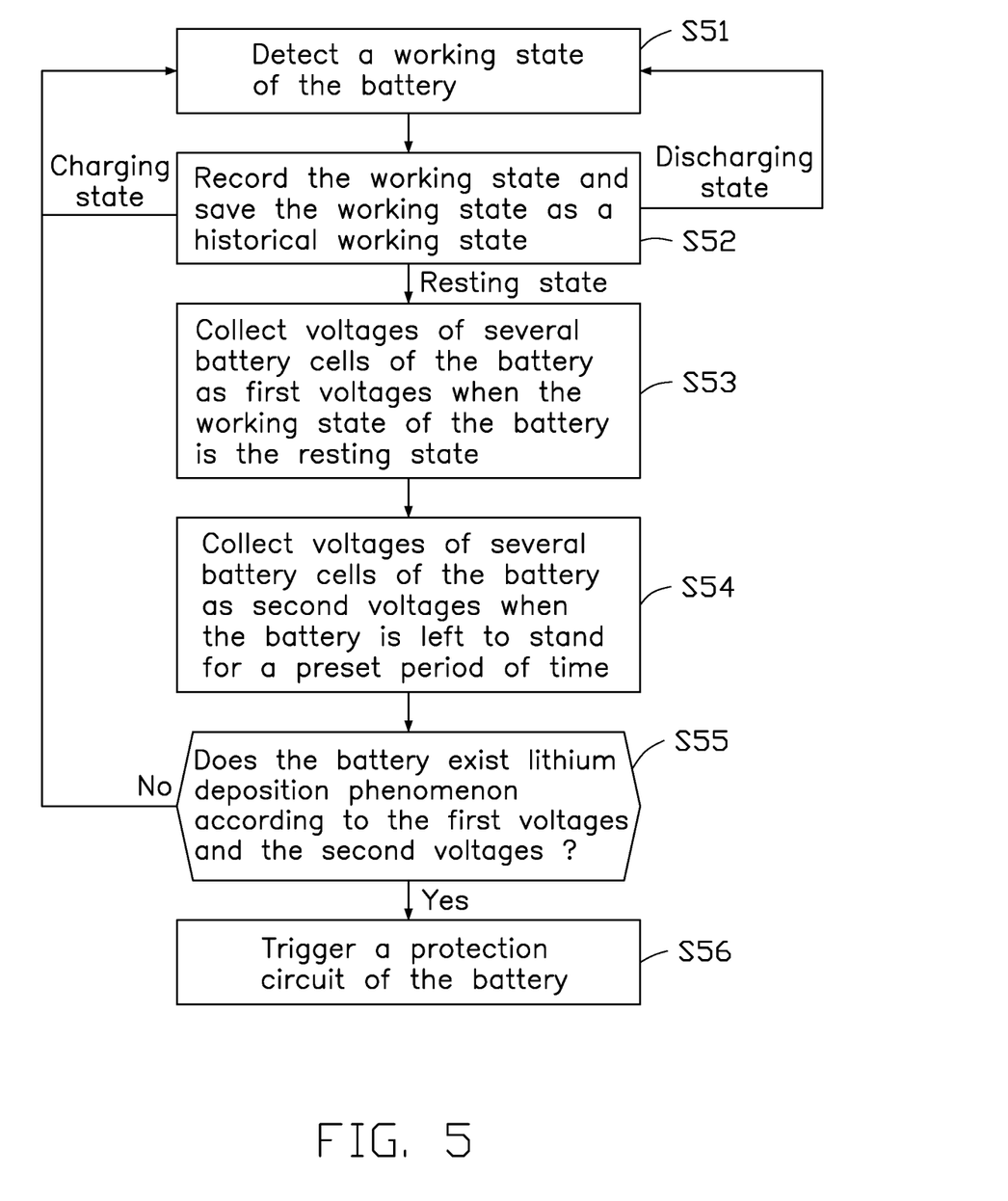
FIG. 5 is a flowchart of embodiment of another method for detecting lithium separation of a battery.

FIG. 5 illustrates a flowchart of another method for detecting lithium separation of the battery. In an example embodiment, the method is performed by execution of computer-readable software program codes or instructions by the processor 19 of the terminal device 10.

Referring to FIG. 5, the method is provided by way of example, as there are a variety of ways to carry out the method. The method described below can be carried out using the configurations illustrated in FIG. 4, for example, and various elements of these figures are referenced in explaining method. Each block shown in FIG. 5 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S51.

At block S51, the detecting module 101 can detect a working state of the battery 11.

In at least one embodiment, the detecting module 101 can determine the working state of the battery 11 by comparing a first current value with the current threshold. The first current value of the battery 11 is collected by the ADC 1 every first time interval (e.g., 500 ms).

In at least one embodiment, the first time interval may be one second, the current threshold may be 5 mA, and the working state of the battery 11 can include a charging state, a discharging state, and a resting state.

In at least one embodiment, when the battery 11 begins to operate, the processor 19 can activate an internal clock timer to work. The ADC 1 can collect a first current value of the battery 11 every first time interval (e.g., 500 ms) and obtain a number of first current values and transmit the number of first current values to the processor 13. The processor 19 can receive the number of first current values, and compare the number of first current values with the current threshold to determine the working state of the battery 11. In at least one embodiment, the detecting module 101 can determine that the working state of the battery 11 is the charging state when each of the number of first current values is greater than the current threshold. The detecting module 101 can determine that the working state of the battery 11 is the discharging state when each of the number of first current values is less than an opposite value of the current threshold. The detecting module 101 can determine that the working state of the battery 11 is the resting state when an absolute value of each of the number of first current values is less than or equal to the current threshold.

At block S52, the detecting module 101 can record the working state and save the working state as a historical working state.

In at least one embodiment, when the detecting module 101 determines that the working state of the battery is the charging state, the detecting module 101 can record the charging state and save the charging state as the historical working state of the battery 11. Then, the process returns to block S51 to continue detecting the working state of the battery 11. When the detecting module 101 determines that the working state of the battery 11 is the discharging state, the detecting module 101 can record the discharging state and save the discharging state as the historical working state of the battery 11. Then, the process returns to block S51 to continue detecting the working state of the battery 11. When the detecting module 101 determines that the working state of the battery 11 is the resting state, the detecting module 101 can record the resting state and save the resting state as the historical working state of the battery 11. Then, the process goes to block S53.

At block S53, the collecting module 102 can collect voltages of several battery cells 14 of the battery 11 as first voltages when the working state of the battery 11 is the resting state.

In at least one embodiment, the working state of the battery 11 is determined as changed by comparing the detected working state of the battery 11 with the recorded historical working state. For example, when the detected working state of the battery 11 is a resting state, and the latest recorded working stat of the historical working state is a resting state, the collecting module 102 can determine that the working state of the battery 11 is maintained and unchanged, and the detecting module 101 continues to detect the working state of the battery 11. When the detected working state of the battery 11 is a resting state, and the latest recorded working state of the historical working state is a discharging state, the collecting module 102 can determine that the working state of the battery 11 is changed from the discharging state to the resting state. The detecting module 101 continues to detect the working state of the battery 11. When the detected working state of the battery 11 is a resting state, and the latest recorded working state of the historical working state is a charging state, the collecting module 102 can determine that the working state of the battery 11 is changed from the charging state to the resting state. The collecting module 102 collects the first voltages of several battery cells 14 of the battery 11.

In at least one embodiment, the collecting module 102 can collect a second current value of the battery 11 when the battery 11 is at rest for a second time interval (e.g., 1 second). As the current value of the resistor 15 can represent the current value of the battery 11, the collecting module 102 can collect the second current value of the resistor 15 and set the collected second current value as the current value of the battery 11. For example, the collecting module 102 can collect a second current value of the resistor 15 by the ADC1, and transmit the second current value to the detecting module 101. The detecting module 101 can compare the second current value with the current threshold, and when the second current value is greater than the current threshold, the detecting module 101 continues to detect the working state of the battery 11. When the second current value is less than the opposite value of the current threshold, the detecting module 101 continues to detect the working state of the battery 11. The detecting module 101 can acquire the first voltages of several battery cells 14 of the battery 11 when the absolute value of the second current value is less than or equal to the current threshold.

In at least one embodiment, the first voltages are voltages across several battery cells 14. For example, the voltage V1-1 across the battery cell 1 is collected by the analog-to-digital converter ADC2, the processor 19 can receive the voltage V1-1 sent by the ADC2. The voltage V1-2 across the battery cell 2 is collected by the analog-to-digital converter ADC3, the processor 19 can receive the voltage V1-2 sent by the ADC3, and so on. The analog-to-digital converter ADCm can collect the voltage V1-N across the battery cell N, and the processor 19 can receive the voltage V1-N sent by the ADCm.

At block S54, the collecting module 102 can collect voltages of several battery cells 14 of the battery 11 as second voltages when the battery 11 is left to stand for a preset period of time.

In at least one embodiment, the collecting module 102 can determine a working state of the battery 11 by comparing a third current value collected by the ADC1 with the current threshold. When the third current value is greater than the current threshold, the detecting module 101 can determine that the working state of the battery 11 is the charging state and the process returns to block S51 to detect the working state of the battery 11. When the third current value is less than the opposite value of the current threshold, the detecting module 101 can determine that the working state of the battery 11 is the discharging state and the process returns to block S51 to detect the working state of the battery 11. When the absolute value of the third current value is less than or equal to the current threshold, the detecting module 101 can determine that the working state of the battery 11 is the resting state and the collecting module 102 can collect the second voltages of the battery 11.

In at least one embodiment, the second voltages are voltages across several battery cells 14. For example, the voltage V2-1 across the battery cell 1 is collected by the analog-to-digital converter ADC2, the processor 19 can receive the voltage V2-1 sent by the ADC2. The voltage V2-2 across the battery cell 2 is collected by the analog-to-digital converter ADC3, the processor 19 can receive the voltage V2-2 sent by the ADC3, and so on. The analog-to-digital converter ADCm can collect the voltage V2-N across the battery cell N, and the processor 19 can receive the voltage V2-N sent by the ADCm.

In at least one embodiment, the preset period of time is greater than the second time interval.

At block S55, the processing module 103 can determine whether the lithium separation phenomenon exists in the battery 11 according to the first voltages and the second voltages.

In at least one embodiment, the processing module 103 can calculate differences when the second voltages minus the first voltages, and determine whether the battery 11 exists lithium separation phenomenon by comparing the differences with the preset voltage value. When one difference is greater than the preset voltage value, the processing module 103 can determine that the lithium separation phenomenon exists in the battery 11, the process goes to block S56. When the differences are less than or equal to the preset voltage value, the processing module 103 can determine that the lithium separation phenomenon does not exist in the battery 11, and the process returns to block S51.

For example, when the difference when the second voltage V2-1 of the battery cell 1 minus the first voltage V1-1 is greater than the preset voltage value, the processing module 103 can determine that the lithium separation phenomenon exists in the battery 11. When the difference when the second voltage V2-2 of the battery cell 2 minus the first voltage V1-2 is greater than the preset voltage value, the processing module 103 can determine that the lithium separation phenomenon exists in the battery 11. Or when the difference when the second voltage V2-N of the battery cell N minus the first voltage V1-N is greater than the preset voltage value, the processing module 103 can determine that the lithium separation phenomenon exists in the battery 11.

At block S26, the processing module 104 can trigger a protection circuit of the battery 11.

In at least one embodiment, the processing module 104 can send a control command to the battery 11 for triggering the protection circuit when it is determined that the phenomenon exists. For example, the processing module 104 can send the control command to trigger the switch driver 170 to turn off the switch MOS 171.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A battery lithium detection method applicable in a terminal device, the terminal device comprising a battery, the method comprising:
   detecting a working state of the battery;
   collecting a first voltage of the battery when the working state of the battery is a resting state;
   collecting a second voltage of the battery when the battery is left to stand for a preset period of time; and
   determining whether a lithium separation phenomenon has occurred in the battery according to a comparison of a calculated difference in the first voltage and the second voltage with a preset voltage value.

2. The method according to claim 1, wherein the detecting the working state of the battery comprising:
   collecting a first current value of the battery every first time interval and obtaining a plurality of first current values; and
   determining the working state of the battery by comparing each of the plurality of first current values with a current threshold.

3. The method according to claim 2, wherein determining the working state of the battery comprising:
   the working state of the battery is a charging state when each of the plurality of first current values is greater than the current threshold;
   the working state of the battery is a discharging state when each of the plurality of first current values is less than an opposite value of the current threshold; and
   the working state of the battery is a resting state when an absolute value of the first current value is less than or equal to the current threshold.

4. The method according to claim 3, wherein collecting the first voltage of the battery comprising:
   collecting the first voltage of the battery when the detected working state of the battery is the resting state and a latest recorded working state of a historical working state is the charging state.

5. The method according to claim 4, wherein the method further comprising:
   determining that the working state of the battery has changed from the charging state to the resting state;
   collecting a second current value of the battery when the battery has been resting for a second time interval;
   comparing the second current value with the current threshold; and
   collecting the first voltage of the battery when an absolute value of the second current value is less than or equal to the current threshold.

6. The method according to claim 1, wherein collecting the second voltage of the battery comprising:
   collecting a third current value of the battery when the battery is left to stand for the preset period of time;
   comparing the third current value with a current threshold; and
   collecting the second voltage of the battery when an absolute value of the third current value is less than or equal to the current threshold.

7. The method according to claim 1, wherein the determining whether the lithium separation phenomenon has occurred comprising:
   calculating a difference of the second voltage minus the first voltage;
   comparing the difference with the preset voltage value; and
   determining that the lithium separation phenomenon has occurred in the battery when the difference is greater than the preset voltage value.

8. The method according to claim 7, wherein the method further comprising:
   triggering a protection circuit of the battery when the lithium separation phenomenon has occurred in the battery.

9. A non-transitory storage medium having stored thereon instructions that, when executed by a processor of a terminal device, causes the processor to perform a battery lithium detection method, the terminal device comprising a battery, the method comprising:
   detecting a working state of the battery;
   collecting a first voltage of the battery when the working state of the battery is a resting state;

collecting a second voltage of the battery when the battery is left to stand for a preset period of time; and determining whether a lithium separation phenomenon has occurred in the battery according to a comparison of a calculated difference in the first voltage and the second voltage with a preset voltage value.

10. The non-transitory storage medium according to claim 9, wherein the detecting the working state of the battery comprising:

collecting a first current value of the battery every first time interval and obtaining a plurality of first current values; and determining the working state of the battery by comparing each of the plurality of first current values with a current threshold.

11. The non-transitory storage medium according to claim 9, wherein collecting the second voltage of the battery comprising:

collecting a third current value of the battery when the battery is left to stand for the preset period of time;

comparing the third current value with a current threshold; and collecting the second voltage of the battery when an absolute value of the third current value is less than or equal to the current threshold.

12. The non-transitory storage medium according to claim 9, wherein the determining whether the lithium separation phenomenon has occurred comprising:

calculating a difference of the second voltage minus the first voltage;

comparing the difference with the preset voltage value; and determining that the lithium separation phenomenon has occurred in the battery when the difference is greater than the preset voltage value.

* * * * *